Patented Aug. 14, 1945

2,382,529

UNITED STATES PATENT OFFICE 2,382,529

PREPARATION OF CHLORINATED RUBBER COMPOSITIONS

Làszló Auer, South Orange, N. J.

No Drawing. Application June 12, 1942,
Serial No. 446,773

8 Claims. (Cl. 260—736)

This invention relates to chlorinated rubber compositions and to a method of preparing the same.

Although not limited thereto, the invention is of especial utility in connection with protective or decorative coating compositions containing chlorinated rubber. Compositions of this type commonly incorporate, in addition to the chlorinated rubber, other film-forming ingredients, especially oils, and sometimes also resins. These vehicle forming ingredients are ordinarily dissolved in an organic solvent or a mixture of solvents, to provide the desired consistency, for instance, for brushing or spraying application. Still other materials may be present, but detailed consideration thereof is not necessary to an understanding of the present invention.

One of the principal objects of the invention is to compound a chlorinated rubber coating composition containing chlorinated rubber, an organic solvent (or solvent mixture) and other film-forming ingredients, most especially fatty oils, the oil ingredient, preferably prior to admixture with the others, being treated with a modifying agent contributing to the solubility of the oil in the particular solvent employed in the composition.

The foregoing facilitates dissolution of the oil in the solvent, and the compatibility of the chlorinated rubber therewith.

In considering another aspect of the invention, it is noted that many heat-bodied oils are not easily compatible with chlorinated rubber, at least in substantial percentages. This has been disadvantageous for the reason that bodied oils have the capability of improving film characteristics as compared with unbodied oils. With this difficulty in mind, the invention provides for employment of a heat-bodied oil of a type which has been treated with an agent for improving the solubility characteristics of the oil, in consequence of which I have found that the compatibility of the oil with chlorinated rubber is substantially improved.

Briefly considered, the process for treating the oil comprises dispersion of an agent in the oil, which agent has the capability of promoting the solubility of the oil. Certain of the solubility-promoting agents contemplated further have the characteristic of facilitating the heat-bodying of the oil. Alternatively, the oil may conjointly or sequentially be treated with one agent for facilitating the heat-bodying and with another agent for increasing the solubility characteristics.

Treating or modifying agents which are suitable for the various purposes contemplated by this invention are of quite a wide variety of types, many of which (having characteristics facilitating heat-bodying) are mentioned in a number of my patents and pending applications including, for example, Patent No. 2,180,342, Patent No. 2,189,772, Patent No. 2,213,944, application No. 305,409, filed November 20, 1939, and issued August 18, 1942, as Patent No. 2,293,038, and application No. 318,650, filed February 12, 1940, and issued October 13, 1942, as Patent No. 2,298,270. It may be noted that the present application is a continuation-in-part of my copending application Serial No. 305,409.

A number of modifying agents are specifically mentioned hereinafter, and, in addition, reference may be had to the above mentioned patents for many examples of suitable modifying agents and also for suitable treatment procedure. It may be mentioned, however, that in general, modifying agents suitable for the present purposes are inorganic and organic compounds which are electrolytes or polar compounds capable of influencing or modifying the oils. In this connection it is to be noted that fatty oils are organic isocolloid substances, i. e., colloids in which the dispersed phase and the dispersion medium are both of the same chemical composition, though present in different physical states.

The fatty oils which may be used may either be drying oils, semi-drying oils, or non-drying oils. Specific examples of such oils are as follows:

| | |
|---|---|
| Tung oil | Rapeseed oil |
| Oiticica oil | Pine oil |
| Linseed oil | Olive oil |
| Perilla oil | Corn oil |
| Sunflower oil | Cottonseed oil |
| Poppyseed oil | Coconut oil |
| Soya bean oil | Castor oil |
| Walnut oil | Fish oils (train oils) |

The amount of modifying agent used in my processes is a minor amount by weight on the oil; an amount not exceeding 30%. Generally from 1% to 30% of the polar compound is used. However, in some cases less than 1% gives desirable improvements in the oil; sometimes as little as 0.01% being used. An advantageous range is from 0.01% to 10% of polar compound on the fatty oil, and most usually from 2% to 5%. Generally I find that the amount of modification of the final products increases with the amount of polar compound used, when the other conditions are the same.

Following treatment of the oil, the oil may be dissolved in the organic solvent (or solvent mixture) to be employed in the particular chlorinated rubber composition being prepared; and the solvent and oil are, of course, blended with the chlorinated rubber and any other ingredients which may be used in the composition.

As mentioned toward the beginning of this specification, I have found that the solubility in organic solvents of my fatty oil products and other modified organic isocolloids, obtained by the processes set forth, vary quite markedly and in part depend upon the particular polar compound employed. When my modified products are made with the aid of a polar compound which itself is insoluble in certain organic solvents, the modified product as obtained is also insoluble or difficultly soluble in those particular solvents.

On the other hand, I have found that if the polar compound employed is itself soluble in certain organic solvents, the modified products made with it are likewise soluble in the same solvents. For instance, ammonium iodide or other polar compounds soluble in acetone produce modified castor oil products which are also readily soluble in acetone.

Thus, in preparing my coating compositions, one method of the present invention is to heat the fatty oil with a polar compound which itself is soluble in the organic solvent or solvents to be used in such composition. Then the modified fatty oil so produced and containing such polar compound dissolved or dispersed therein is dissolved in the matched solvent to obtain the desired solution. This simple method is advantageous and can be used with any of my modified oil products produced with the aid of polar compounds which themselves are soluble in various solvents, such as benzene, acetone and other ketones, butyl acetate and other ester solvents, methyl alcohol and other alcohols, etc.

Also, my modified products, made with a polar compound insoluble in such solvents, and which cannot be directly used to prepare solutions in such solvents, can be made soluble in them by a subsequent treatment. In this subsequent treatment, the insoluble modified oil product is fused with a minor amount of an organic compound which is soluble in such solvents. The fused material so obtained can now be dissolved in the said solvent or solvents and useful coating compositions obtained. This method can be also used to improve the solubility of unmodified oils, which are naturally difficultly soluble in these solvents. In either case, my polar compounds which are soluble in the said solvents may be used to so improve the solubility of these oils, both the modified ones and the unmodified or natural ones.

The two step method ante for making soluble modified oil products, by first using an insoluble polar compound as the primary modifying agent and then a soluble compound to convert the insoluble oil product into a soluble one, may be simplified into a single step method by adding both the insoluble and the soluble compounds to the oil in the beginning; both the primary modifying agent and the secondary or solubilizing agent being present during the initial heating.

Still further, a fatty oil may first be bodied without the addition of a polar compound and then the bodied oil so obtained heated with a polar compound to modify it.

In the fields of protective coatings and plastics, it is very desirable to produce bodied fatty oils of predetermined solubility properties, or to obtain solutions of such bodied fatty oils in solvents in which they are insoluble.

I have found that the solubility of a fatty oil, whether bodied or not, in a certain solvent or solution of other materials may be greatly influenced and improved by dispersing in these oils or oil products certain agents the characteristic feature of which is their solubility in the medium in question. As mention hereinbefore, the medium may be either a solvent or a mixture of solvents and/or diluents or a solution of another film-forming agent or agents in solvents or solvent mixtures.

The foregoing is highly advantageous in preparing oils for use in chlorinated rubber compositions. It should be kept in mind that chlorinated rubber is not soluble in all solvents used in coating compositions. Therefore, a modifying agent should be used which has solubility in chlorinated rubber solvents, in order to achieve the advantages of the invention. Some suitable solvents for chlorinated rubber are as follows:

Benzol
Toluol
Xylol
Hi-Flash solvent naphtha
Carbon tetrachloride
Ethylene dichloride
Ethyl acetate
Butyl acetate
Amyl acetate
Octyl acetate
Methyl ethyl ketone
Solvesso No. 2 and No. 3

In addition, certain materials are partial solvents including, for instance, the following:

Acetone
Ethyl ether
Solvesso No. 1
Union Oil solvent No. 8, No. 30 and No. 40
Shell solvent TS-28
Shell solvent E-294
Shell solvent E-295
Shell solvent E-296

The Solvesso solvents, Union Oil solvent and the Shell solvents referred to above are all petroleum type solvents with varying content of aromatic hydrocarbons.

Various solvent mixtures are commonly used, but this matter need not be considered in detail herein.

The dissolution promoting agents, according to my invention, may be classified in the following groups: (A) those which are modifying agents themselves, and (B) those which do not modify the viscosity of fatty oils when heated with them at bodying temperatures. Group A, representing the modifying agents, being themselves well soluble in the media in question, may be subdivided into (1) inorganic, and (2) organic agents. The inorganic dissolution promoting modifying agents require higher bodying temperatures for their dispersion in the fatty oils. Usually 250° C. is the lowest temperature limit and the decomposition temperature of the oil is the upper limit. In practice, 290° C. to 310° C. yields satisfactory products in most cases. The organic dissolution promoting modifying agents belong to the class which consists of an organic residue and an inorganic residue and which may develop acids, on the action of heat in the oils, or which consist of organic amines or amino compounds. The organic dissolution promoting modifying agents dissolve at much lower temperatures in the fatty oils, than the inorganic dissolution promoting modifying agents. Some may be dissolved at room temperature, others at temperatures below 200° C. Only very few organic dissolution promoting agents require higher temperatures than 200° C. for their dissolution or dispersion. If it is desirable that the dissolution promoting organic modifying agents should have a bodying action, then it is necessary to heat the oil to bodying temperatures, which is usually above 200° C., and, in most cases, even above 250° C.

The temperature is most usually kept between 270° C. and 320° C. If the dissolution promoting modifying agent is used only for the promotion of the dissolution of the fatty oil product in the solvent, then the heating to bodying temperatures may be omitted and the process is concluded with the dispersion of the agent in the oil. The latter types of agents, to promote dissolution, may be used in addition to inorganic agents or in addition to organic agents which are insoluble in the organic solvents, or they may be used alone or in admixture with other dissolution promoting agents.

Group B, representing the dissolution promoting agents which themselves have no appreciable modifying action on the viscosity of fatty oils at bodying temperatures, are mostly organic compounds and may be used, like the organic dissolution promoting modifying agents, either alone or in admixture with modifying agents, which themselves are not soluble in the organic solvents in question. They may be heated with the oil to bodying temperatures or they may be heated with the oil only until dispersion occurs. The oil to be treated with group B may be a modified or a not modified fatty oil.

According to the present process, in addition to vegetable or animal oils, other isocolloid materials may be similarly treated. Thus, synthetic resins of the fatty acid containing types of alkyds, etc., and synthetic oils, like synthetic fatty oil esters, may also be treated. From the point of view of this invention, such synthetic resins and synthetic oils behave like, and are considered as, fatty oils.

It is remarkable that even in cases where the dissolution promoting agent partially evaporates or decomposes or forms some new chemical compound during the reaction of the heating process, its original behavior in solvents seems to show up in the resulting fatty oil product.

The importance of this invention can be illustrated if a few practical examples are considered. Most thickened fatty oils, for instance, are insoluble in acetone but if I incorporate in them dissolution promoting agents soluble in acetone, I obtain products which are acetone soluble independently of their melting point or viscosity. (The melting point and viscosity are, in the case of unmodified bodied oils, inversely proportional to their solubility.) Further, I have found that the harder a solidified linseed oil product is, the more quickly do the coating compositions made of these oil products dry. The harder solidified oils, the melting points of which are higher, yield in most cases very viscous solutions in their solvent. For certain technical purposes, it is important sometimes to have oil solutions with low viscosity. According to the present invention, if I incorporate a dissolution promoting agent, soluble in the particular solvent or solvent mixture in question, I may obtain comparatively mobile solutions even from hard modified oils. In the above mentioned processes, besides the primary modifying agents, which are necessary to bring about any modification of the fatty oils, secondarily a dissolution promoting agent may be incorporated, which itself does not modify the oil, but which influences the physical properties, and especially the solubility properties of the resulting product when used in connection with the primary modifying agent.

In accordance with the foregoing, the invention makes possible the use of various oils in chlorinated rubber compositions which oils, without treatment, are not well suited for that purpose because of being naturally difficultly soluble (or not soluble at all) in solvents suitable for chlorinated rubber compositions. Moreover, even with oils which are soluble in certain organic solvents employed, the solubility may be improved, thereby permitting use of larger percentages of such oils.

In many cases it is found that less expensive oils than those commonly employed for the purpose may be incorporated in chlorinated rubber compositions, by appropriately treating the oil in accordance with the present invention.

A further important feature of my invention is the preparation of low viscosity solutions of modified bodied oil products in organic solvents, which products normally yield very highly viscous solutions in the same solvents, necessitating further dilution for brushing or spraying purposes. Such solidified oil products yield fast drying coating compositions, but heretofore the solutions thereof were usually so viscous that when diluted to brushing consistency or to spraying consistency the solids content is very much reduced. By dispersing dissolution promoting agents in such oils, e. g. in an after-treatment at low temperatures, low viscosity solutions are produced with higher solids content.

Just below, in Table I, certain modifying agents are listed, with indication of solubility thereof in organic solvents. The table further shows certain agents which, though insoluble when used alone, are soluble when combined with dissolution promoting agents:

TABLE I

List of Experiments to Modify Castor Oil and to Influence Solubility of Bodied Oils Inorganic modifying agents

| Soluble in organic solvents | Insoluble in organic solvents | Inorganic agents which are insoluble alone but soluble when combined with dissolution promoting agents indicated |
|---|---|---|
| Barium thiocyanate | | |
| $HgCl_2$ | | |
| $NaI$ | | |
| $NaI$ plus $HCOOH$ | | |
| $NH_4I$ | $K_2SO_3$ | $Li_2CO_3$ plus p-cresol |
| $CdI_2$ | $Li_2CO_3$ | $Li_2CO_3$ plus phenol |
| $ZnBr_2$ | $Li_2SO_3$ | $Li_2CO_3$ plus alpha-naphthol |
| $MgCl_2$ | $Sr.CO_3$ | $Li_2CO_3$ plus beta-naphthol |
| $NaBr$ | $MgCO_3$ | $Li_2SO_3$ plus p-cresol |
| $BaCl_2$ | Na-acetate | $Li_2SO_3$ plus phenol |
| $NH_4Cl$ | $NaCl$ | $Li_2SO_3$ plus alpha-naphthol |
| $HgBr_2$ | $NaCl$ plus $HCOOH$ | $Li_2SO_3$ plus beta-naphthol |
| $SnCl_4$ | $Al_2(SO_4)_3$ | |
| $ZnCl_2$ | | |
| $BiCl_3$ | $NaHSO_3$ | |
| | $NaHSO_4$ | |
| | $KHSO_4$ | |
| | $KHSO_3$ | |

*Organic modifying agents soluble in organic solvents*

2:5 dichloro-benzol-sulfonic acid
o-Nitrophenol
p-Nitrophenol rinated rubber, as well as in some solvents not commonly used in chlorinated rubber compositions. The symbols indicate solubility, as follows: S=soluble, C=in the cold, I=insoluble, Sl. S.= slightly soluble, V=very, M=miscible.

TABLE II

| Type of reagent | Solvents | | | |
|---|---|---|---|---|
| | Acetone | Methyl alcohol | Benzol | Butyl acetate |
| *Inorganic modifying and simultaneously dissolution promoting agents* | | | | |
| Sodium iodide | S | S | I | I. |
| Sodium bromide | I | Sl. S | I | I. |
| Ammonium iodide | Sl. S | S | S | Sl. S. |
| Calcium oxalate | Sl. S | S | S | Sl. S. |
| Zinc acetate | I | Sl. S | I | I. |
| Magnesium chloride | I | S | S | I. |
| Zinc bromide | S | S | I | S. |
| Potassium sulfide | Sl. S | Sl. S | I | I. |
| Sodium thiosulfate | I | S | S | I. |
| Aluminum carbonate | I | V. Sl. S | S | V. Sl. S. |
| Strontium sulfide | I | V. Sl. S | I | I. |
| *Organic modifying and simultaneously dissolution promoting agents* | | | | |
| Basic: | | | | |
| Urea | I | S. C | I | S. H. |
| Meta-xylidine | M | M. C | M. C | M. C. |
| Benzidine base | S | S | S | S. |
| *Acidic, or containing acidic residues* | | | | |
| Benzoic acid | S. C | S. C | S. C | S. C. |
| H. salt | I | I | | Sl. S. |
| Sulfanilic acid | I | I | | Sl. S. |
| Amido-G-salt | I | I | | Sl. S. |
| Beta-oxynaphtoic acid | V. S. C | V. S. C | | V. S. C. |
| Meta-xylidine sulfo acid | I | S. C | | M. |
| Dimethyl sulfate | M | M | | M. |
| Phthalic anhydride | S. C | S | S | S. |
| Monochlor acetic acid | S. C | S. C | S. C | S. C. |
| 2:6 naphtalin disulfo acid | I | Sl. S | I | I. |
| Tobias acid | Sl. S | S | S. C | I. |
| p-Dichlorbenzene | S. C | S. C | S. C | S. C. |
| Fluoresceine | Sl. S | S. C | I | I. |
| o-Nitrophenol | S. C | S. C | S. C | S. |
| Dinitraniline | S. C | S | Sl. S | S. C. |
| p-Toluol sulfo acid | S. C | S. C | I | S. |
| 2:5 dichlorbenz sulfo acid | S. C | S. C | Sl. S | S. |
| Triphenyl phosphate | S. C | S. C | S. C | S. C. |
| p-Aminophenol hydrochloride | I | S | I | I. |
| p-Toluidine m-sulfo acid | Sl. S | S. C | I | I. |
| p-Toluol sulfo chloride | S. C | S. C | S. C | S. C. |
| o-Dichlorbenzol | M. C | M. C | M. C | M. C. |
| p-Nitro acetanilide | Sl. S. C | S. C | Sl. S | Sl. S. |
| p-Chlor o-anisidine | S | S | S | S. |
| p-Nitrophenol | S. C | S | S | S. C. |
| *Nonmodifying organic dissolution promoting agents* | | | | |
| Alpha-naphtol | S. C | S | S | S. |
| Pyrogallol | S. C | S. C | S | S. C. |
| Glucose | I | S | I | I. |
| Phenol (carbolic acid) | S. C | S. C | S. C | S. C. |
| Resorcinol | S. C | S. C | S | S. C. |
| p-Cresol | S. C | S. C | S. C | S. C. |
| o-Cresol | S. C | S. C | S | S. C. |

Benzidine base
p-Nitro chlorbenzene
p-Nitro phenol, and p-cresol
o-Cresol
p-Cresol
Dinitraniline
Fluoresceine
Dichlorbenzene
p-Toluol sulfonic acid
p-Toluol sulfon chloride
Acetyl chloride
Benzoyl chloride

*Mixture of inorganic and organic agents, both soluble in organic solvents*

Barium thiocyanate plus p-cresol
Barium thiocyanate plus phenol

The solubility of modifying and/or dissolution promoting agents in certain organic solvents is indicated in Table II. The table indicates solubility in certain solvents commonly used for chlo-

EXAMPLE 1

100 parts of castor oil are heated together with 5 parts ammonium iodinde in vacuo of 100 mm./Hg pressure for 5 hours at 260° C. A dark colored soft paste is obtained which is soluble in acetone. Ammonium iodide is soluble in acetone. Ammonium iodide causes good solubility in many organic solvents, whereas replacing ammonium iodide with the acetone insoluble lithium carbonate as modifying agent, the resulting product has no solubility in acetone.

EXAMPLE 2

100 parts of castor oil modified by 5 parts of barium thiocyanate under the conditions of Example 1 yield a brown mobile oil which is soluble in butyl acetate and benzol. Barium thiocyanate is soluble in butyl acetate and is moderately soluble in benzene. Increased temperature and duration of heating increases the viscosity of the oil product. In case of more viscous oils prepared with the same modifying and dissolution promoting agent, the solubility is somewhat reduced, but the action of the dissolution promoting agents is still pronounced.

EXAMPLE 3

100 parts of castor oil are treated with 5 parts of zinc bromide at 250° C. in vacuum of 100 mm./Hg pressure. Afte the heating proceeded properly the oil gels in vacuum. Therefore, it is advisable to reduce the amount of zinc bromide to 2 parts, to heat to 200° C., to hold there for 2 hours, to heat within 20 minutes to 230° C. and to hold there for 3 hours. The product is a viscous brown oil, soluble in acetone as well as in butyl acetate. The reagent itself is also soluble in these solvents. If the reaction is repeated in open containers under atmospheric pressure, the product is thicker and is in the cold an elastic solid. It still has good solubility properties in the solvents in which zinc bromide is soluble.

EXAMPLE 4

100 parts of castor oil, 2 parts of lithium carbonate and 5 parts of beta-naphthol are treated in the manner described in Example 1. Temperature of 200° C. is reached in 20 minutes. This temperature is held for 3 hours, the temperature raised to 250° C. and held for 6 hours. The product is a soft pasty light brown solid, having good solubility properties in organic solvents. If in this example castor is replaced by linseed oil, and the temperature raised in the last 6 hours to 290° C. to 300° C., a more solid product is obtained, with satisfactory solubility properties. Soya bean oil yields softer products and fish oil pasty products of medium consistency.

EXAMPLE 5

100 parts of castor oil are treated with 5 parts of 2:5 dichloro-benzenesulfonic acid, as described in Example 1. The product is a thick viscous oil, soluble in butyl acetate, acetone and benzene. The reagent itself is also soluble in those solvents. If instead of 2:5 dichloro-benzenesulfonic acid other dissolution promoting modifying agents are used, the following results are obtained: benzidine base yields a semi-solid, p-nitrochlorbenzene a thin brown oil, dichlorbenzene yields a mobile light oil. If p-cresol is used as non-modifying dissolution promoting agent alone, a clear viscous oil is obtained with similar consistency, than castor oil when heated under similar conditions. All products have good solubilities in the above three solvents and also in other solvent mixtures.

Modified castor oil products with good solubility properties in organic solvents may be used, such as the ones treated with ammonium iodide, ammonium chloride, benzidine base, lithium sulfite plus carbolic acid, lithium carbonate plus p-cresol, 2:5 dichlorobenzene sulfonic acid, barium thiocyanate plus p-cresol, p-nitrophenol. A heat-bodied castor oil, containing p-cresol as dissolution promoting agent alone yields also satisfactory results. As the alcohols are usually bad solvents for bodied oils, coal tar hydrocarbons may be well used as thinners.

Many of the above examples yield satisfactory compatibility in chlorinated rubber varnishes. Good solubility may also be obtained in tetra chlor ethane and similar solvents. Glycol ethers are amongst other solvents, in which good solubility may be obtained.

In compounding chlorinated rubber coating compositions, oil treated in accordance with the present invention is usually advantageously used in quantities upwards of 10 parts of oil to 100 parts of chlorinated rubber.

Modified castor oil products also have useful drying properties and may be used in preparation of coating compositions. If only drying is important, then smaller proportions of reagents may be added, such as fractions of 1%, like 0.1%, or 0.2%, 0.05%. The modifying agents herein described are polar compounds. A polar compound which is soluble in an organic solvent is a dissolution-promoting polar compound or one which has dispersing properties.

I claim:

1. In the manufacture of chlorinated rubber coating compositions dissolved in aromatic hydrocarbon solvents, the process which includes preparing a fatty oil for compounding with the chlorinated rubber by dispersing in the fatty oil from 2% to about 10% of a salt, the cation of which consists of a member of the class of alkali metals, ammonium, alkaline earth metals, zinc and magnesium, and the anion of which consists of a member of the class of carbonates, sulfites and sulfides, said salt being capable of promoting heat bodying of the oil and heating the mixture at a temperature between about 100° C. and 300° C. to yield a heat bodied fatty oil which is difficulty soluble in said solvents, treating said fatty oil while at elevated temperature with a dissolution promoting agent soluble in said solvents and consisting of a member of the class of phenols, naphthols, benzoic acid, phthalic acid and phthalic anhydride, whereby the solubility characteristics of the treated oil in said solvents are increased, and thereafter compounding the treated fatty oil with the chlorinated rubber and said solvents.

2. A process in accordance with claim 1 wherein the salt and the dissolution promoting agent are employed sequentially.

3. A process in accordance with claim 1 wherein the salt and the dissolution promoting agent are employed conjointly.

4. A process in accordance with claim 1 in which the quantity of the salt dispersed in the oil is between 2% and 5% of the weight of the oil.

5. A process in accordance with claim 1 in which the fatty oil is a drying oil.

6. A process in accordance with claim 1 in which the fatty oil is a non-drying oil.

7. A process in accordance with claim 1 in which the fatty oil is linseed oil.

8. A process is accordance with claim 1 in which the fatty oil is castor oil.

LÀSZLÓ AUER.